United States Patent Office 2,767,509
Patented Oct. 23, 1956

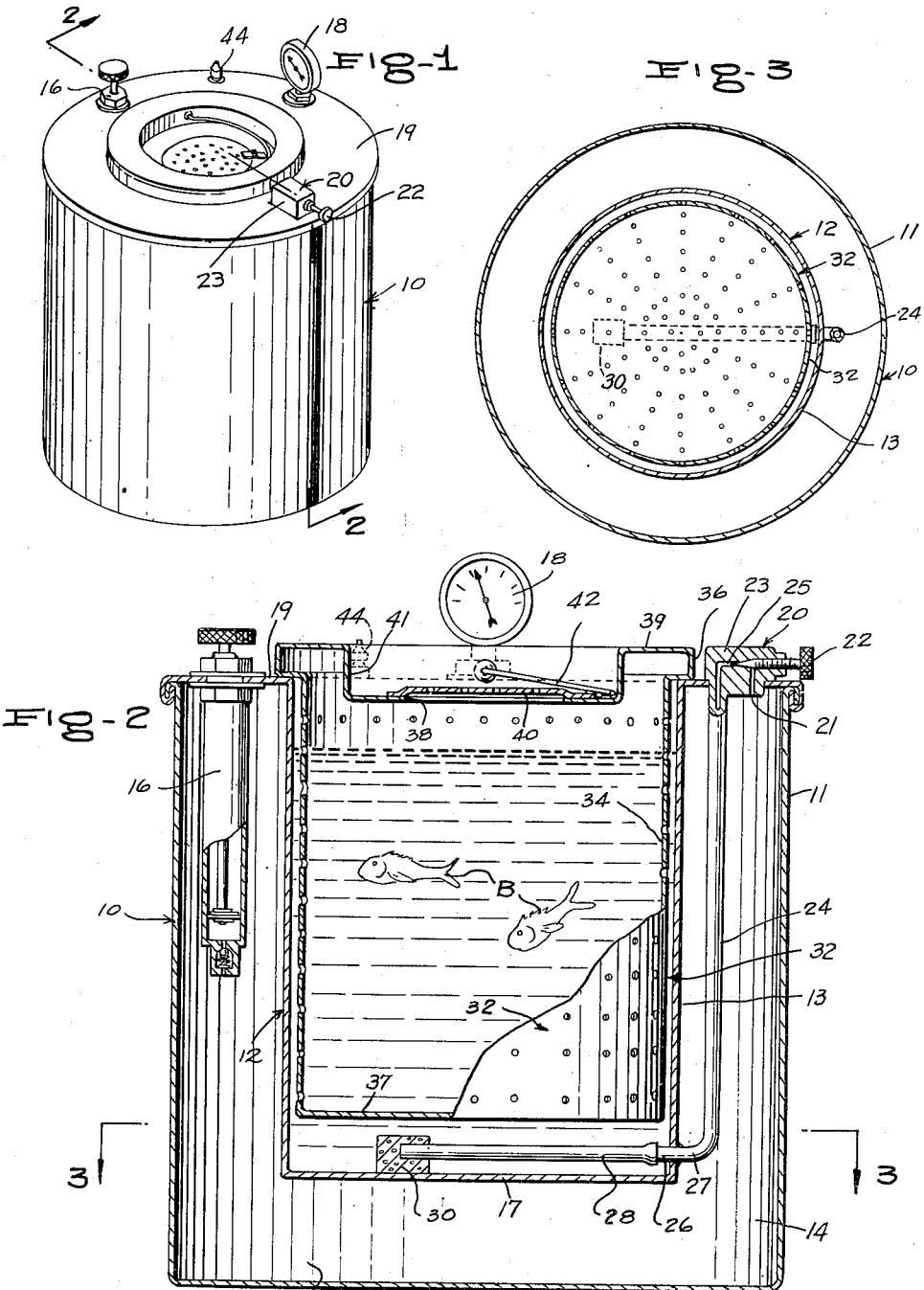

2,767,509

LIVE BAIT BUCKET

Donald E. Breithaupt, Modoc, Kans.

Application July 26, 1955, Serial No. 524,496

3 Claims. (Cl. 43—57)

This invention relates to an improved aerated live bait bucket, and the primary object of the invention is to provide a more practical and efficient device of this kind which can be made in a rugged and serviceable form at relatively low cost.

Other important objects and advantageous features of the invention will be apparent from the following description and the accompanying drawings, wherein, for purposes of illustration only, a specific form of the invention is set forth.

In the drawings:

Figure 1 is a perspective view of a live bait bucket embodying the features of this invention;

Figure 2 is an enlarged vertical sectional view taken substantially on the line 2—2 of Figure 1; and Figure 3 is a horizontal sectional view on a reduced scale taken substantially on the line 3—3 of Figure 2.

Referring to the drawings in detail, the illustrated bucket comprises a double walled container 10 having spaced outer and inner side walls 11 and 13 and vertically spaced bottom walls 15 and 17, defining therebetween a pressure air chamber 14 closed at the upper end by a common annular top wall 19. The inner side wall 13 and the bottom wall 17 define a well 12 open at the top of the bucket. Mounted on and depending through the top wall 19 is a manual air pump 16 by means of which air may be introduced into and compressed in the chamber 14, as will be readily understood upon reference to the drawings. The pump 16 is of conventional construction and forms no part of the invention except in combination therewith. It is to be understood, of course, that if so desired, any suitable valve mechanism may be employed for introducing and confining air under pressure within the chamber 14 which valve mechanism may be connected to a source of air pressure. In the preferred form of the invention, a suitable pressure gauge 18 is mounted on the top wall 19 and communicates with the interior of the reservoir 14 so that the user may readily ascertain the air pressure within the chamber.

Mounted on the top wall 19 of the container 10 is a control valve 20 which has a passage 21 which communicates with the interior of the chamber, as shown in Figure 2, so that the flow of air out of the chamber 14 through the body 23 of the valve 20 may be regulated by a valve element 22 threaded in the outer end of a passage 25 in the body 23. The inner end of the passage 25 communicates with a pipe 24 which depends in the chamber 14 and has a lateral lower end 27 traversing the inner side wall 13 of the double walled container 10 to define a nipple 26 to which is connected one end of a flexible tube 28 which extends across the well 12 above and near the bottom thereof. It is to be understood, of course, that the junction of the pipe 24 and the wall 13 is sealed in any conventional manner against the passage of air directly from the chamber 14 into the well 12. Secured on the free end of the flexible tube 28 is a block 30 of porous material which serves to break the air flowing through the tube 28 into a multiplicity of minute streams so as to create tiny bubbles within water contained within the well 12.

Depending into the well 12 through the upper open end thereof is a bait pail 32 having a perforated side wall 34 which permits the free flow of air and water through the pail in order to sustain life in live bait B, contained within the pail. On the upper end of the pail is an annular lateral flange 36 which rests upon the top wall 19 of the double walled container 10 and suspends the pail 32 freely in the well 12 with the imperforate bottom 37 of the pail in spaced relation above the bottom wall 17 of the well 12. The upper end of the pail 32 is provided with a top wall 39 having therein a depression 41 provided with an access opening 38 through which bait may be introduced into the pail 32 and closing said access opening 38 is a conventional cover 40. A conventional bail 42 is carried by the top wall of the pail 32 to facilitate removing and replacing the pail in the well 12.

In use, it will be understood that the well 12 is filled with water to a selected height and the perforated bait pail 32 is introduced into the well through the top thereof with its flange 36 resting on the top wall 19 of the container. Air may be introduced into the reservoir 14 either by means of a conventional tire valve 44 (Figure 1) on the top wall 19, or by operating the pump 16. Upon opening the control valve element 22 to a selected degree, air then flows from the chamber 14 through the pipe 24 and tube 28 and into the well 12 through the porous block 30. By thus introducing air into the well 12, the water contained therein will be aerated and the bait B kept alive for prolonged periods. Obviously, when so desired, the pail may be removed from the container and submerged in a body of water when the fisherman reaches his fishing grounds. The supply of air within the chamber 14 may be maintained by operating the pump 16 or if so desired by introducing air into the chamber through the valve 44.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In an aerated bait bucket, a double walled container comprising spaced outer and inner side walls, and vertically spaced bottom walls, and a top wall extending between said side walls, said walls defining an air pressure chamber and said inner side wall and one of said bottom walls defining a well open at its upper end, a removable closed bait pail having a perforated side wall and a bottom wall and an upper end, a lateral flange on said upper end resting upon the top wall of the container with the bottom wall of the pail spaced above the bottom wall of the well, a pipe depending in said chamber having a lower portion traversing the well side wall and terminating in an outlet opening in the space between the bottom walls of the pail and the well, said pipe having an upper end, valve means on the container top wall with which the upper end of the pipe is connected, said valve means having a valve element operable to provide or deny communication between the interior of the chamber and said pipe, and means on the container top wall for introducing air under pressure into said chamber.

2. In an aerated bait bucket, a double walled container comprising spaced outer and inner side walls, and vertically spaced bottom walls, and a top wall extending between said side walls, said walls defining an air pressure chamber and said inner side wall and one of said bottom walls defining a well open at its upper end, a removable closed bait pail having a perforated side wall and a bottom wall and an upper end, a lateral flange on said upper end resting upon the top wall of the container with the bottom wall of the pail spaced above the bottom wall of the well, a pipe depending in said chamber having a lower portion traversing the well side wall and terminating in an outlet opening in the space between the bottom walls of the pail and the well, said pipe having an upper end, valve means on the container top wall with which the upper end of the pipe is connected, said valve means having a valve element operable to provide or deny communication between the interior of the chamber and said pipe, means on the container top wall for introducing air under pressure into said chamber, and a top wall on said upper end of the pail having an access opening provided with a removable cover.

3. In an aerated bait bucket, a double walled container comprising spaced outer and inner side walls, and vertically spaced bottom walls, and a top wall extending between said side walls, said walls defining an air pressure chamber and said inner side wall and one of said bottom walls defining a well open at its upper end, a removable closed bait pail having a perforated side wall and a bottom wall and an upper end, a lateral flange on said upper end resting upon the top wall of the container with the bottom wall of the pail spaced above the bottom wall of the well, a pipe depending in said chamber having a lower portion traversing the well side wall and terminating in an outlet opening in the space between the bottom walls of the pail and the well, said pipe having an upper end, valve means on the container top wall with which the upper end of the pipe is connected, said valve means having a valve element operable to provide or deny communication between the interior of the chamber and said pipe, means on the container top wall for introducing air under pressure into said chamber, said valve means comprising a valve body having a passage therein having an end opening through the body and another end, a valve element threaded in said open end, said other end of the passage being connected to said pipe, and another passage leading through said body into said chamber from the first mentioned passage at a point intermediate the ends of said first mentioned passage, said valve element being movable in the first mentioned passage to cover and uncover said other passage.

References Cited in the file of this patent

UNITED STATES PATENTS

| | | |
|---|---|---|
| 1,604,971 | Churchill et al. | Nov. 2, 1926 |
| 1,731,921 | Coleman et al. | Oct. 15, 1929 |
| 2,123,932 | Carriveaw | July 19, 1938 |
| 2,550,533 | Clark | Apr. 24, 1951 |
| 2,736,983 | Hostetter | Mar. 6, 1956 |